J. STALLINGS.
SPRING WHEEL.
APPLICATION FILED JULY 20, 1910.

972,280.

Patented Oct. 11, 1910.

James Stallings,
Inventor,
by Chas. H. Fowler
Attorney

Witnesses

UNITED STATES PATENT OFFICE.

JAMES STALLINGS, OF FAIRMOUNT, ILLINOIS.

SPRING-WHEEL.

972,280.  Specification of Letters Patent.  Patented Oct. 11, 1910.

Application filed July 20, 1910. Serial No. 572,933.

*To all whom it may concern:*

Be it known that I, JAMES STALLINGS, a citizen of the United States, residing at Fairmount, in the county of Vermilion and State of Illinois, have invented certain new and useful Improvements in Spring-Wheels, and do hereby declare that the following is a full, clear, and exact description of the same, reference being had to the annexed drawings, making a part of this specification, and to the letters and figures of reference marked thereon.

The increased cost of rubber and certain practical objections to the use of rubber for pneumatic and other yielding tires for automobiles and other vehicles, render desirable a cushion tire for automobiles and other vehicles having all the elasticity and other good qualities of the pneumatic tire without the drawbacks due to the employment of rubber and air, and the object of my invention, therefore, is to provide a cushion tire possessing the required elasticity, and yet economical of construction, durable and of ready application to automobile and other vehicle wheels, and to this end my invention consists in the cushioned wheel constructed substantially as hereinafter specified and claimed.

Figure 1:
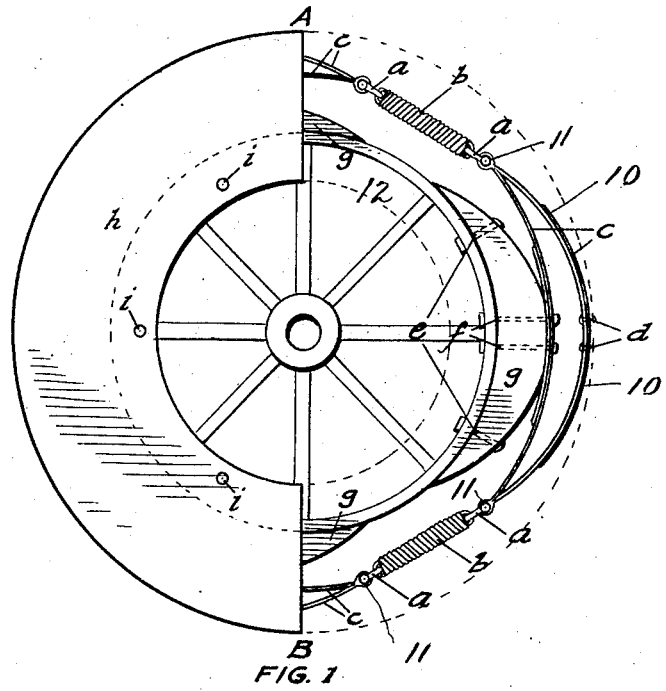
Figure 2:
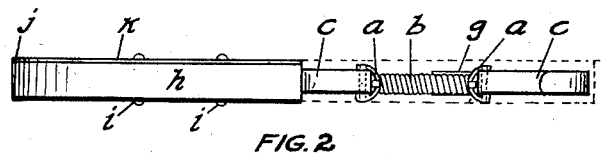
Figure 3:
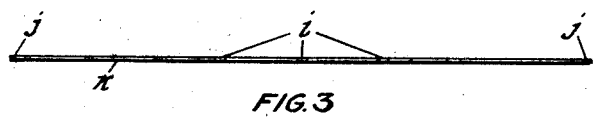
Figure 4:
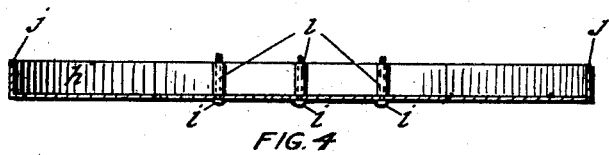

In the accompanying drawing—Figure 1 is a side elevation or wheel equipped with a tire embodying my invention, a portion of the inclosing casing being removed to show the interior construction; Fig. 2 a top plan view thereof; and Figs. 3 and 4 are detail views of the outer casing parts.

In embodying my invention in a practical form, I employ a circular series of crescent shaped springs 10, each formed of two leaf spring members $c$ joined at their ends and at each extremity having an eye 11. The eye-carrying extremities of adjacent springs 10, are spaced apart and a clevis $a$ pivoted in each eye is attached to one end of a coil spring 7 that yieldingly draws the ends of adjacent springs 10 toward each other and yieldingly maintains them in proper position so that it will be seen that I provide a circular series of crescent shaped springs 10, and coil springs alternating with each other. The concave side of each spring 10 is inward and it is firmly attached as by bolts $f$ to the convex side of a crescent shaped block $g$, having near each end radial holes $e$ for the passage of bolts by means of which the crescent shaped block may be attached to the felly or rim of a wheel 12. The crescent shaped blocks $g$ while forming a simple means of attachment of the device to the felly or rim of the wheel without any change in the wheel rim or felly, affords a solid and firm support for the springs while permitting all movement that may be required to afford the desired cushioning effect.

Inclosing the series of springs and their attaching blocks $g$ is a circular shell or casing composed of two side members $h$ and $k$, the member $h$ having a circumferential rim or flange that forms a tread and to which the outer member of each crescent shaped spring 10 is fixed or secured as by bolts or screws passing through small holes $d$ in the outer leaf spring $c$. The side plates $h$ and $k$ are secured together by bolts $i$ which pass through spacing or separator tubes $l$.

It will be evident that by my invention I provide a spring wheel which combines with the necessary stiffness or rigidity required for automobiles and other vehicles, all necessary cushioning capacity, and which possesses such strength as to render it not liable to injury, so that it is durable.

It is understood that there are details of construction in the embodiment of my invention illustrated which I have described, which may be varied from without involving any departure from the scope of my invention.

What I claim is—

As an improvement in automobile and other vehicle wheels, the combination of a circular series of crescent shaped and coil springs in alternate arrangement, connections between the springs formed of engaging eyes and clevises, crescent shaped blocks at the concave side of the crescent shaped springs, said blocks having means for attachment to a wheel rim or tire, a tire forming shell or casing having side members, one of which has a circumferential rim or flange, and means connecting said rim or flange to said crescent shaped spring.

In testimony whereof I affix my signature in presence of two witnesses.

JAMES STALLINGS.

Witnesses:
EDWIN ROBERTSON,
E. F. REESE.